United States Patent [19]

Shimizu et al.

[11] Patent Number: 5,559,701
[45] Date of Patent: Sep. 24, 1996

[54] AUTOMOTIVE SUSPENSION CONTROL SYSTEM FOR ANTI-ROLLING CONTROL UTILIZING A STEERING SENSOR AND BODY ACCELEROMETERS

[75] Inventors: Hiroyuki Shimizu; Toru Takahashi; Makoto Kimura, all of Kanagawa Prefecture, Japan

[73] Assignee: Atsugi Unisia Corporation, Japan

[21] Appl. No.: 439,235

[22] Filed: May 11, 1995

Related U.S. Application Data

[63] Continuation of Ser. No. 922,490, Jul. 31, 1992, abandoned.

[30] Foreign Application Priority Data

Aug. 6, 1991 [JP] Japan ................................. 3-196514

[51] Int. Cl.⁶ ............................................. B60G 17/033
[52] U.S. Cl. ............................................. 364/424.05
[58] Field of Search ..................... 364/424.05; 280/707, 280/772; 318/611; 73/118.1

[56] References Cited

U.S. PATENT DOCUMENTS

| | | | |
|---|---|---|---|
| 4,555,126 | 11/1985 | Ishimitsu et al. | 280/707 |
| 4,616,163 | 10/1986 | Kanai et al. | 318/611 |
| 4,687,223 | 8/1987 | Miyoshi et al. | 280/707 |
| 4,924,696 | 5/1990 | Schroeder et al. | 73/118.1 |
| 5,015,009 | 5/1991 | Ohyama et al. | 280/772 |
| 5,016,910 | 5/1991 | Nagai | 280/707 |
| 5,024,460 | 6/1991 | Hanson et al. | 280/707 |
| 5,087,068 | 2/1992 | Fukanaga et al. | 280/707 |
| 5,113,345 | 5/1992 | Mine et al. | 364/424.05 |
| 5,165,715 | 11/1992 | Sakamoto et al. | 280/707 |
| 5,287,068 | 2/1994 | Mine et al. | 364/424.05 |

FOREIGN PATENT DOCUMENTS

| | | |
|---|---|---|
| 0115202 | 3/1988 | European Pat. Off. . |
| 0426340 | 5/1991 | European Pat. Off. . |
| 3917716 | 12/1989 | Germany . |
| 59-117510 | 8/1984 | Japan . |

*Primary Examiner*—Kevin J. Teska
*Assistant Examiner*—Dan Fiul
*Attorney, Agent, or Firm*—Ronald P. Kananen

[57] ABSTRACT

An anti-rolling control system for an automotive vehicle is provided. This control system comprises shock absorbers each disposed between a vehicle body and a suspension member rotatably supporting a wheel and being variable of damping force within a range from soft to hard damping characteristics, a steering sensor for monitoring a steered angle of a steering wheel, and a rolling motion control unit. The rolling motion control unit is operable to derive steering angular velocity based on the steered angle of the steering wheel to determine a transient status of vehicle rolling motion when the steering angular velocity is greater than a threshold value. When the vehicle is in the transient status of rolling motion, the damping forces of the shock absorbers are modified to suppress the rolling motion.

5 Claims, 11 Drawing Sheets

AUTOMOTIVE SUSPENSION CONTROL SYSTEM FOR ANTI-ROLLING CONTROL UTILIZING A STEERING SENSOR AND BODY ACCELEROMETERS

This application is a continuation of application Ser. No. 07/922,490 filed Jul. 31, 1992 now abandoned.

BACKGROUND OF THE INVENTION

1. Field of the Invention

The present invention relates generally to a suspension control system for an automotive vehicle. More particularly, the invention is directed to modify damping coefficients of shock absorbers for suppressing rolling motion in transient turning, for example, when a vehicle enters a corner or approaches an end of the corner, securing good driving comfort.

2. Description of the Prior Art

Japanese Utility Model First Publication No. 59-117510 discloses an anti-rolling control system for an automotive vehicle. This control system is responsive to a sensor signal from a lateral acceleration sensor which detects lateral acceleration acting on a vehicle body to increase damping forces of shock absorbers or spring constants of air springs for suppressing rolling motion.

However, such a prior art suspension control system encounters a drawback in that the system is also responsive to lateral acceleration caused by vehicle attitude change created when a vehicle travels on an inclined road surface or is in steady circle turning. This causes transmissibility of vibration of an unsprung mass to a vehicle body to be undesirably increased, resulting in unpleasant riding comfort. In other words, modification of damping coefficients of shock absorbers does not serve to regulate vehicle attitude change due to inclination of a road surface. Additionally, during steady turning, a vehicle body remains inclined once a vehicle body is rolled. Therefore, even if damping coefficients of the shock absorber are modified during steady turning, the vehicle attitude change is not suppressed. In other words, the adjustment of damping coefficients of shock absorbers after transient rolling motion does not serve to control vehicle attitude change. Accordingly, it is desirable to perform damping force control of a shock absorber when the vehicle is in transient turning for suppressing sudden attitude change caused by rolling motion.

SUMMARY OF THE INVENTION

It is therefore a principal object of the present invention to avoid the disadvantages of the prior art.

It is another object of the present invention to provide a suspension control system for an automotive vehicle which serves to modify damping coefficients of shock absorbers for suppressing rolling motion in a transient turning status, for example, when a vehicle enters a corner or approaches an end of the corner, securing good driving comfort.

According to one aspect of the present invention, there is provided a suspension control system which comprises shock absorbers disposed between a vehicle body and suspension members rotatably supporting wheels respectively, each shock absorber being variable of damping force over a range from soft to hard damping characteristics, damping force adjusting means for modifying the damping forces of the shock absorbers respectively, sensor means for monitoring a preselected vehicle driving parameter representing vehicle rolling motion to provide a signal indicative thereof, and control means responsive to the signal from the sensor means for detecting a transient status of rolling motion, the control means providing control signals to the shock absorbers to modify the damping characteristics for suppressing the rolling motion when the vehicle is in the transient status of rolling motion.

In the preferred mode, the sensor means includes a steering angle sensor which detects a steered angle of a steering wheel to provide a signal indicative thereof, the control means serves to determine whether the vehicle is in the transient status of rolling motion or not based on the steered angle of the steering wheel.

Additionally, the control means modifies the damping force during a compression stroke of the shock absorber arranged at a portion of the vehicle body lowered caused by the rolling motion to the hard characteristic and the damping force during an extension stroke of the shock absorber arranged at a portion of the vehicle body lifted up caused by the rolling motion to the hard characteristic.

Further, the system includes first and second vertical acceleration sensors, the first vertical acceleration sensor being mounted on a first lateral portion of the vehicle body to detect vertical acceleration acting on the first lateral portion, the second vertical acceleration sensor being mounted on a second lateral portion of the vehicle body opposite the first lateral portion to detect vertical acceleration acting on the second lateral portion. The control means determines a vertical speed difference between the first and second lateral portions of the vehicle body based on the vertical accelerations detected by the first and second vertical acceleration sensors for terminating rolling motion control when the vertical speed difference is decreased to within a preselected range.

BRIEF DESCRIPTION OF THE DRAWINGS

The present invention will be understood more fully from the detailed description given hereinbelow and from the accompanying drawings of the preferred embodiments of the invention. However, the drawings are not intended to imply limitation of the invention to a specific embodiment, but are for explanation and understanding only.

In the drawings.

DESCRIPTION OF THE PREFERRED EMBODIMENT

Figure 1:
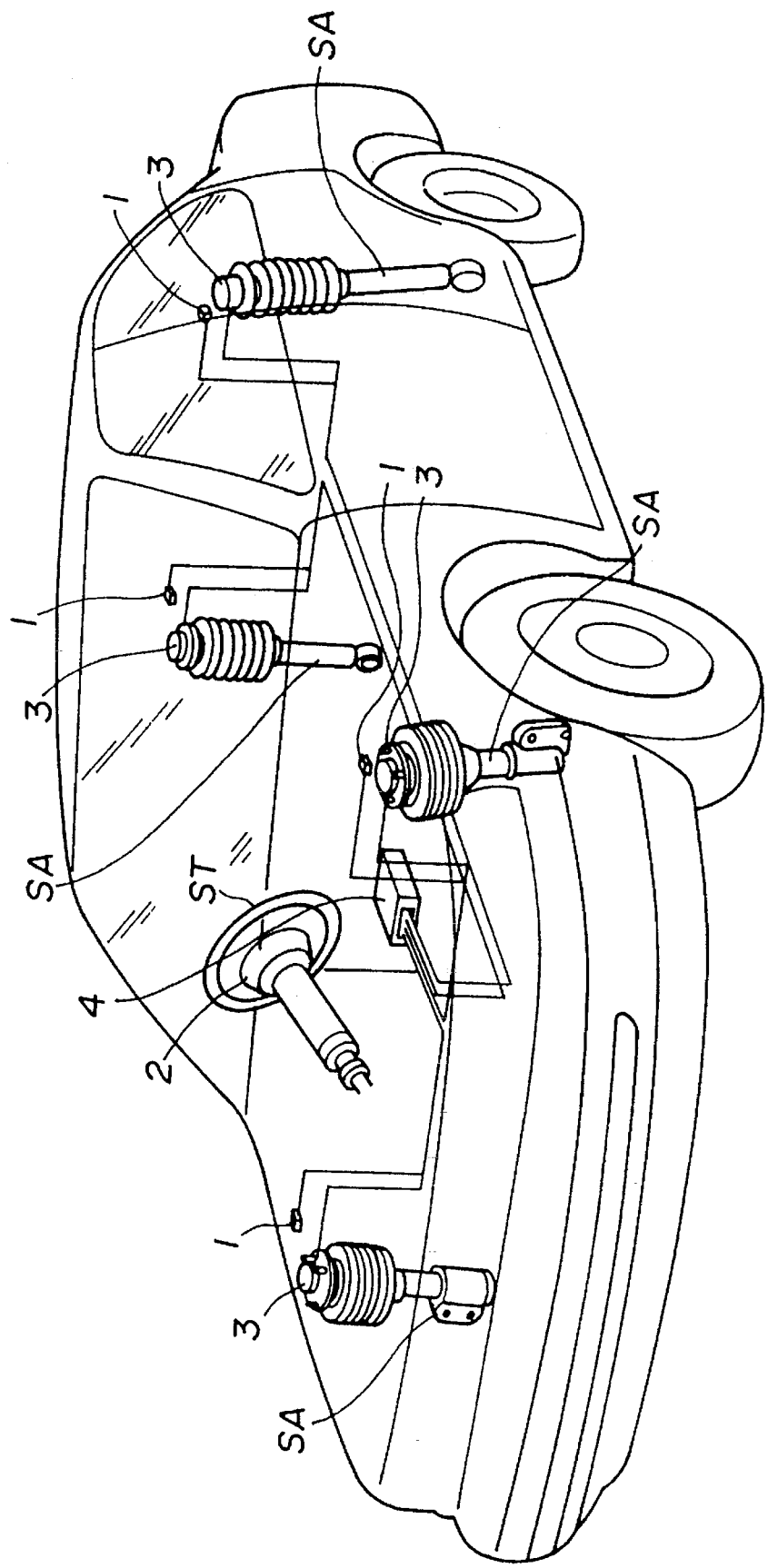
FIG. 1 is a perspective view which shows an automative vehicle incorporating a suspension control system according to the present invention.

Referring now to the drawings, particularly to FIG. 1, a suspension control system according to the present invention is shown. This system includes generally four suspension units comprised of shock absorbers SA, vertical acceleration sensors (hereinafter, referred to as a vertical G sensor), a steering sensor 2, and a control unit 4.

Each of the shock absorbers SA is disposed between a vehicle body and a suspension member supporting a road wheel rotatably. The vertical G sensors 1 are mounted on portions of the vehicle body adjacent the shock absorbers for monitoring vertical accelerations acting on the vehicle body respectively to provide signals indicative thereof to the control unit 4. The steering sensor 2 is mounted on a steering wheel ST which detects a steered angle of the steering wheel ST representing an actual steered angle of the front wheels and provides a signal indicative thereof to the control unit 4. The control unit 4 is arranged adjacent a driver's seat and is responsive to the signals from the vertical G sensors 1 and the steering sensor 2 to provide control signals to pulse motors 3 of the shock absorbers SA for modifying damping forces thereof to suppress vehicle attitude change.

Figure 2:
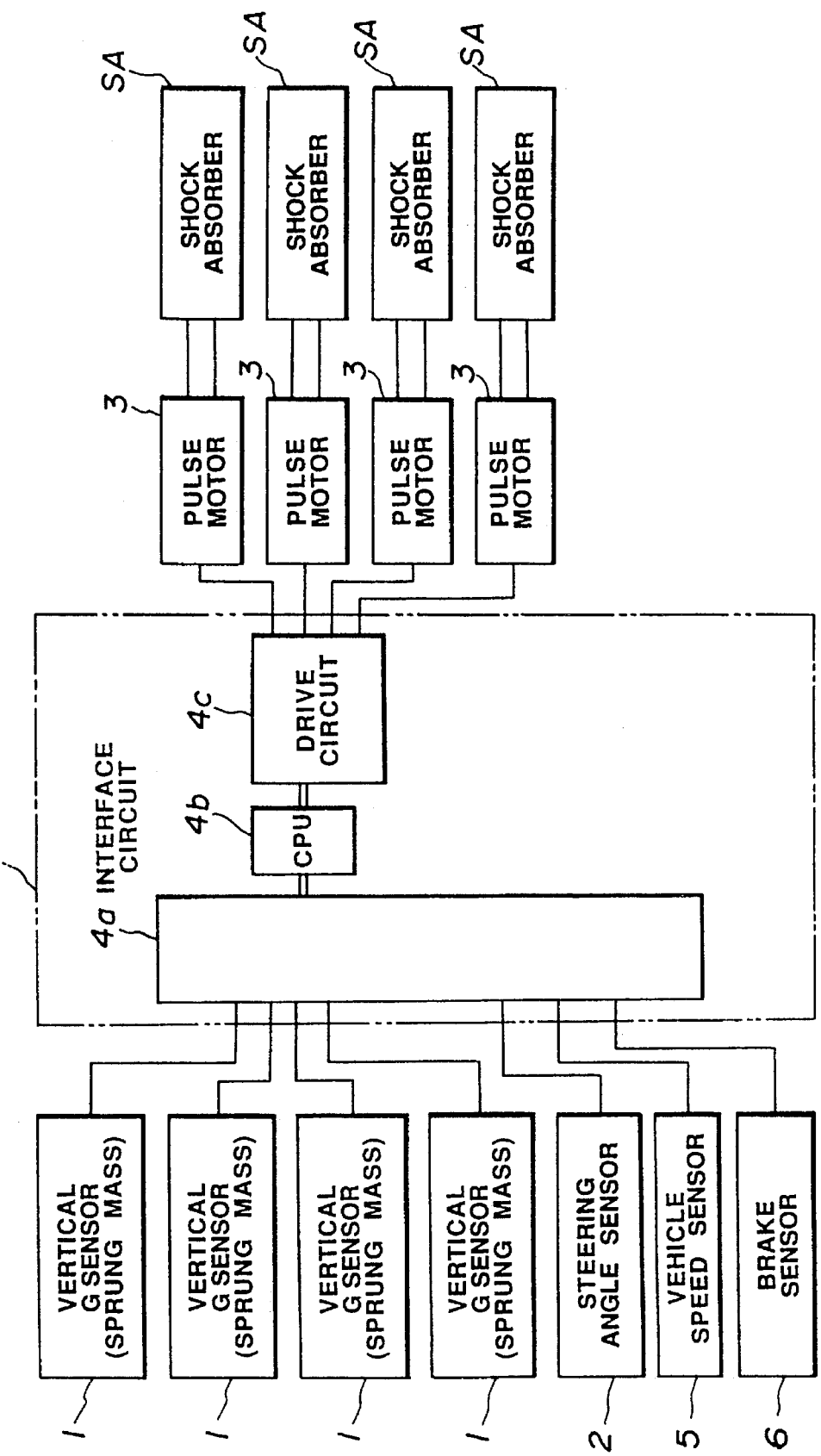
FIG. 2 is a block diagram which shows a suspension control system of the invention.

Referring to FIG. 2, the control unit 4 includes an interface circuit 4a, a CPU (Central Processing Unit) 4b, and a drive circuit 4c. The suspension control system further includes a vehicle speed sensor 5 for monitoring vehicle speed to provide a signal indicative thereof and a brake sensor 6 for detecting braking operation to provide a signal indicative thereof to the control unit 4.

Figure 3:
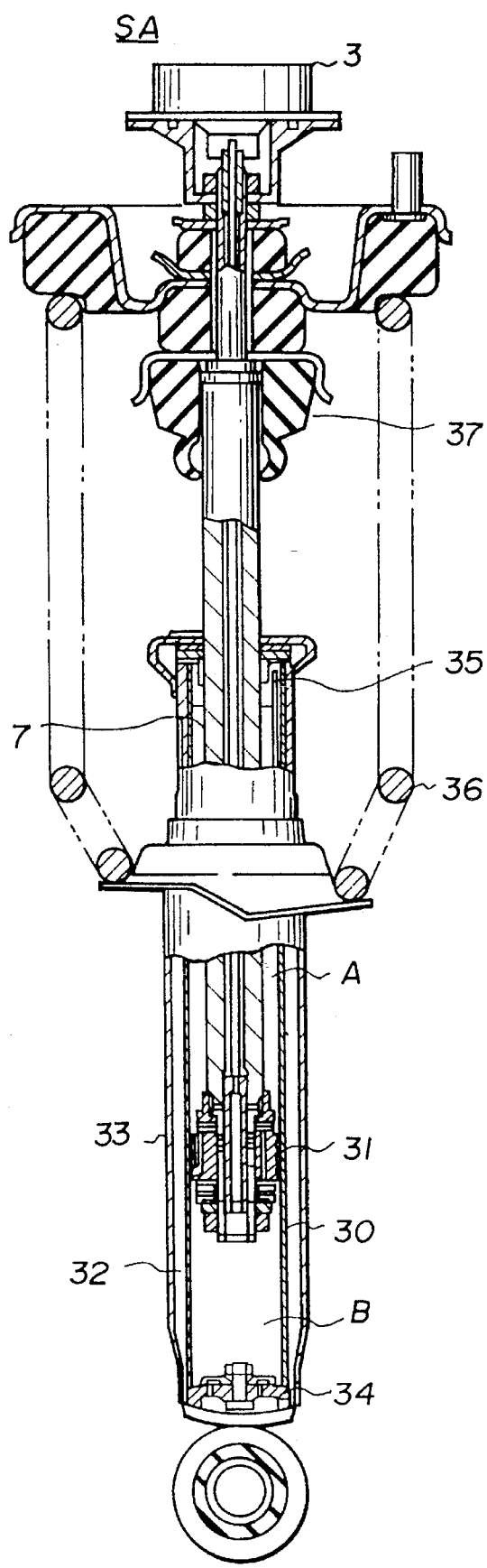
FIG. 3 is a cross-sectional view which shows a variable damping force shock absorber utilized for suppressing vehicle rolling motion.

Referring to FIG. 3, a cross-sectional structure of each shock absorber SA is shown. The shock absorber SA includes an inner cylinder 30, a piston assembly 31 for defining upper chamber and lower chamber A and B, an outer cylinder 33 for defining a reservoir chamber 30 between the outer cylinder 33 and the inner cylinder 30, a base or bottom member 34 for defining the lower chamber B and the reservoir chamber 32, a guide member for guiding slide movement of a piston rod 7 linked to the piston assembly 31, a suspension spring 36 interposed between a flange installed on the outer cylinder 33 and the vehicle body, and a bumper rubber member (or bushing) 37.

Figure 4:
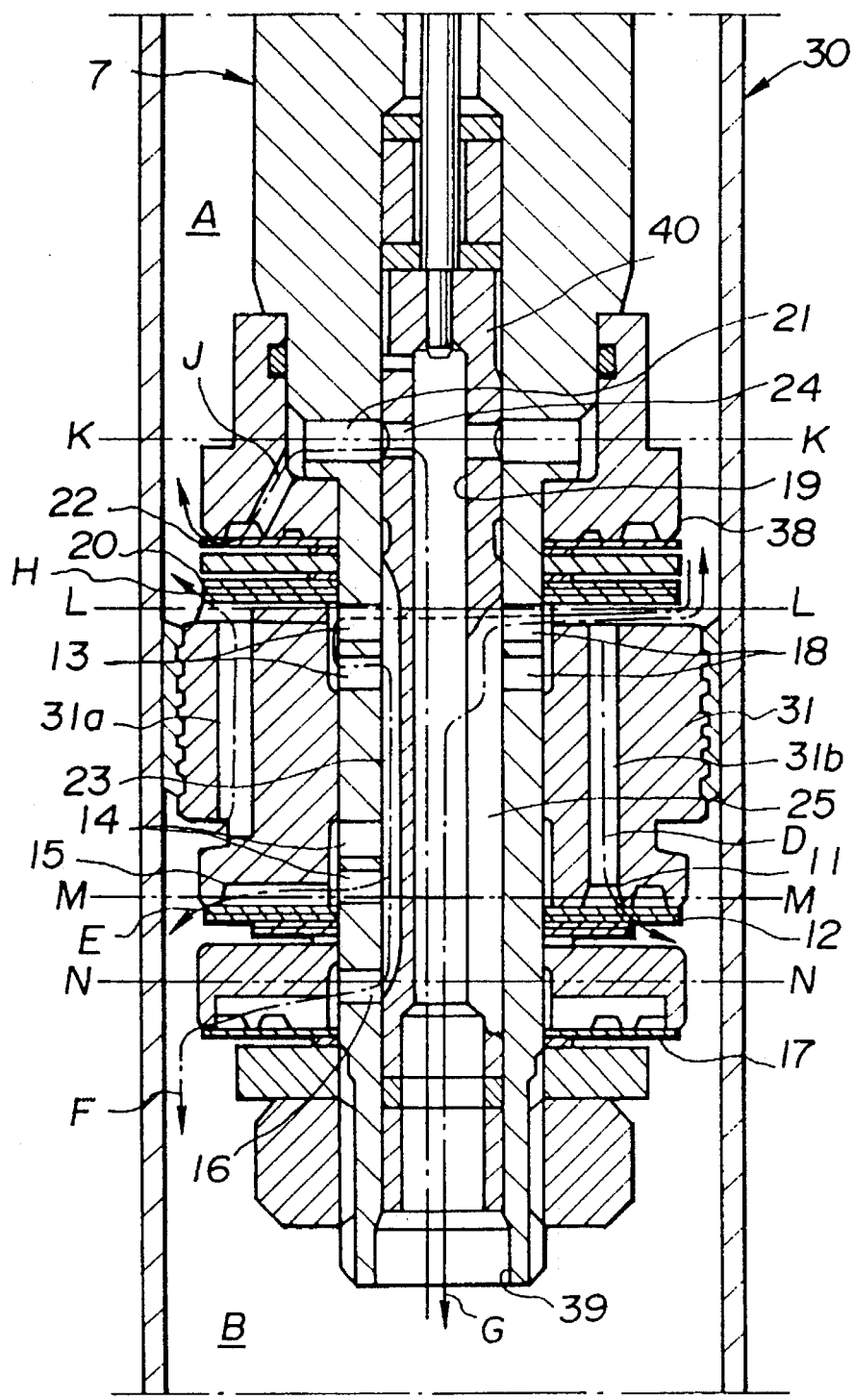
FIG. 4 is an enlarged cross-sectional view which shows a piston assembly of a shock absorber.

Referring to FIG. 4, there is shown a cross-sectional structure of the piston assembly 31. The piston assembly 31 includes penetrating holes 31a and 31b, an extension phase damping valve 12, and a compression phase damping valve 20. The extension and compression phase damping valves 12 and 20 serve to open and close the penetrating holes 31a and 31b respectively.

The piston assembly 31 further includes a piston rod 7, a communication hole 39, an adjusting pin 40, an extension phase check valve 17, a compression phase check valve 22, and a retainer 38 as a valve seat for the check valve 22. The piston rod 7 passes through the piston assembly 31. The communication hole 39 is formed in an end portion of the piston rod 7 which fluidly communicates between the upper chamber A and the lower chamber B. The adjusting pin 40 includes a hollow portion 19, a lateral hole 24, an axial slot 25, and a longitudinal groove 23 in an outer periphery thereof. The adjusting pin 40 is supported by the piston rod 7 so as to be allowed to circumferentially rotate for modifying a flow passage cross-sectional area of the communication hole 39. The rotational movement of the adjusting pin 40 is, as shown in FIG. 3, controlled by the pulse motor 3. The extension phase check valve 17 is operable to allow a working fluid to flow from the upper to lower chambers A and B, while the compression phase check valve 22 allows fluid flow from the lower to upper chambers B and A. Additionally, provided in an end portion of the piston rod 7 are a first port 21, a second port 13, a third port 18, a fourth port 14, and a fifth port 16 (as they will be referred to hereinafter).

Hence, four fluid flow passages are formed between the upper chamber A and the lower chamber B as fluid flow communicable passages during an extension or rebounding stroke of the shock absorber SA:

1) a first extension phase passage D directing fluid flow from the penetrating hole 31b to the lower chamber B through an inner side of the opened extension phase damping valve 12;

2) a second extension phase passage E directing fluid flow from the second port 13, the longitudinal hole 23, and the fourth port 14 to the lower chamber B through the outer periphery of the extension phase damping valve 12;

3) a third extension phase passage F directing fluid flow from the second port 13, the longitudinal hole 23, and the fifth port 16 to the lower chamber B via the opened extension phase check valve 17; and 4) a bypass flow passage G directing fluid flow from the third port 18 to the lower chamber B through the axial slot 25 and the hollow portion 19.

For the compression phase or during a bounding stroke of the shock absorber SA, the following three passages are provided as the fluid flow passages:

1) a compression phase first flow passage H directing fluid flow from the penetrating hole 31a to the upper chamber A through the opened compression phase damping valve 20;

2) a compression phase second flow passage J directing fluid flow from the hollow portion 19, the lateral hole 24, and the first port 21 to the upper chamber A through the opened compression phase check valve 22; and 3) a bypass flow passage G directing fluid flow from the hollow portion 19, the axial slot 25 and the third port 18 to the upper chamber A.

Figure 5:
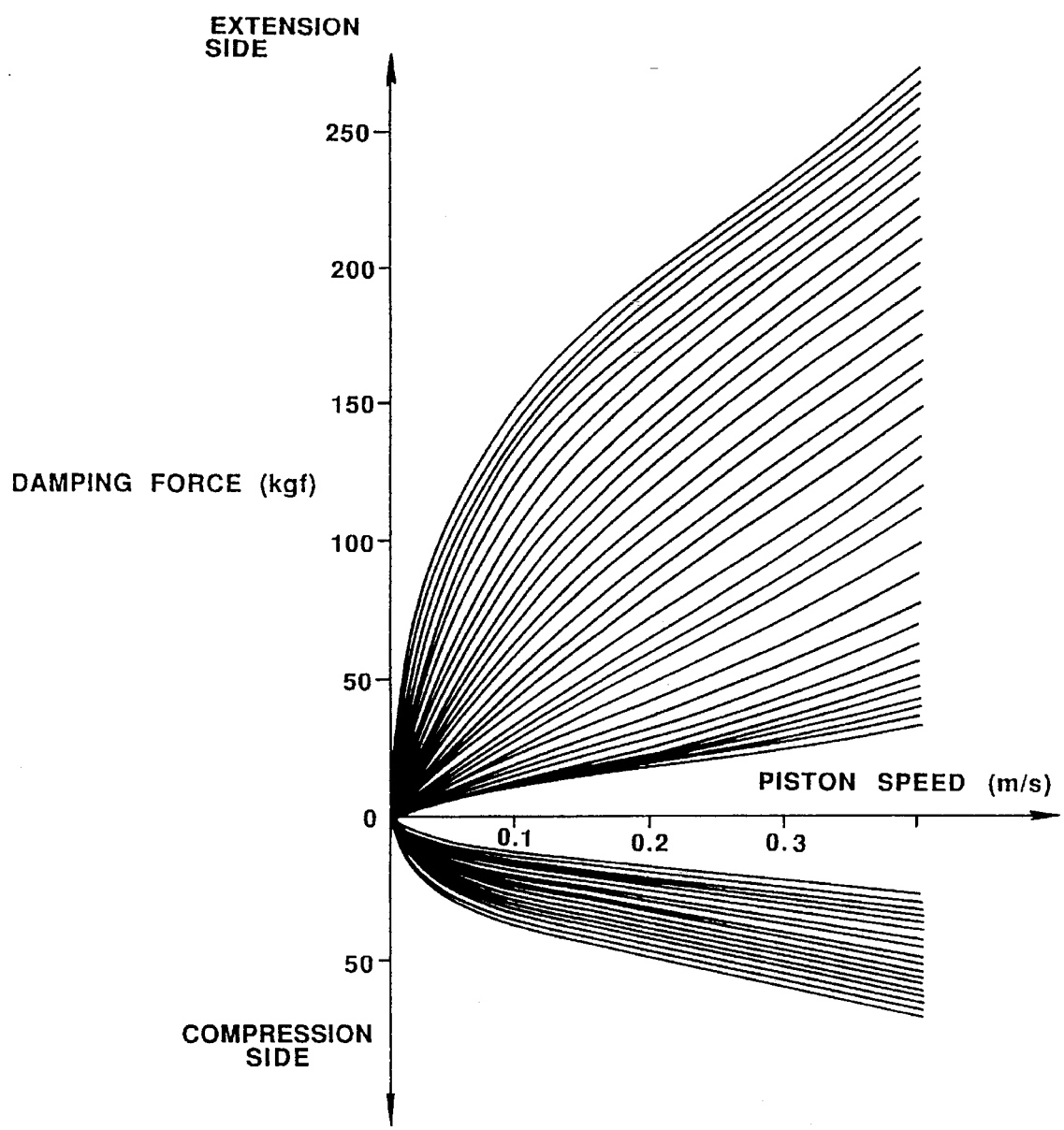
FIG. 5 is a graph which shows a relation between piston speed and damping force of a shock absorber.

With the above arrangements, rotation of the adjusting pin 40 causes a damping coefficient of the shock absorber SA to vary at multiple stages, as shown in FIG. 5, within a range from the lowest damping coefficient (hereinafter, referred to as a soft damping position) to the highest damping coefficient (hereinafter, referred to as a hard damping position) during bounding and rebounding strokes.

Figure 6:
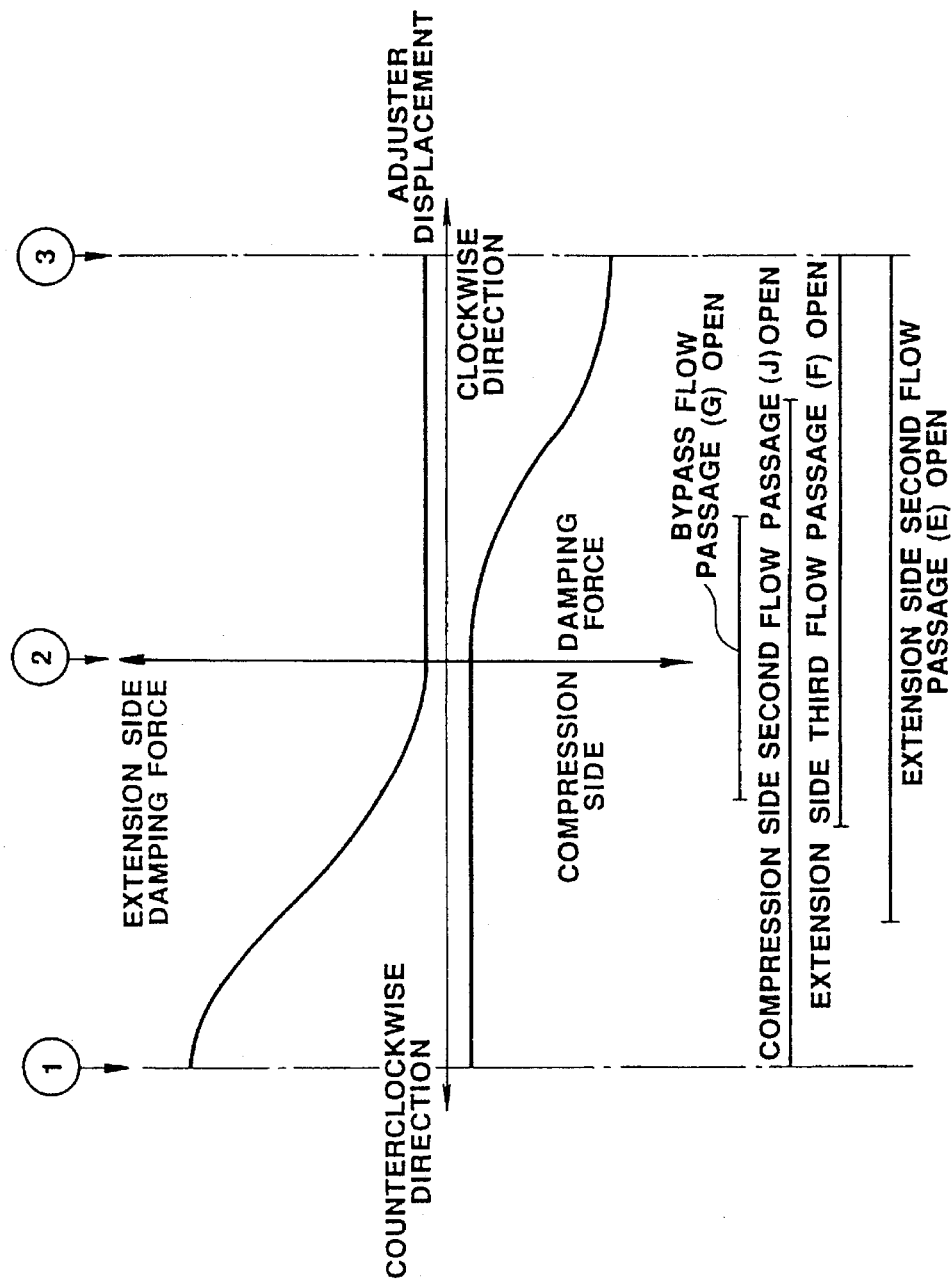
FIG. 6 is a graph which shows a relation between an angular position of an adjusting pin and damping force of a shock absorber.
Figure 7A:
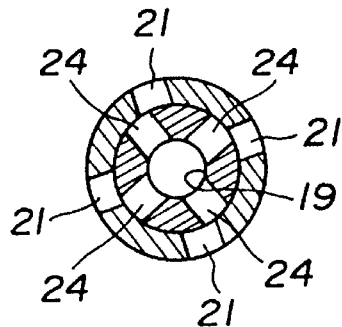
FIG. 7(a) is a cross-sectional view taken along the line K—K in FIG. 4 which shows an adjusting pin at a position ① in FIG. 6.
Figure 7B:
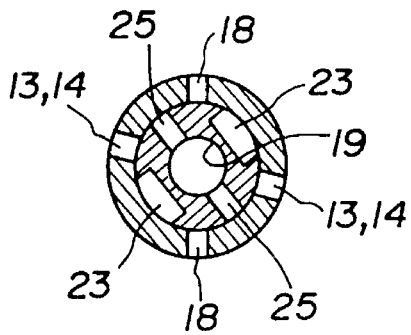
FIG. 7(b) is a cross-sectional view taken along the line M—M in FIG. 4 which shows an adjusting pin at a position ① in FIG. 6.
Figure 7C:
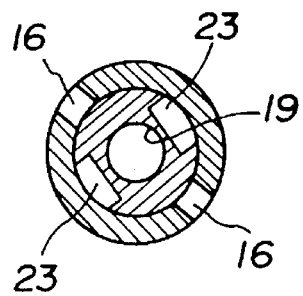
FIG. 7(c) is a cross-sectional view taken along the line N—N in FIG. 4 which shows an adjusting pin at a position ① in FIG. 6.
Figure 8A:
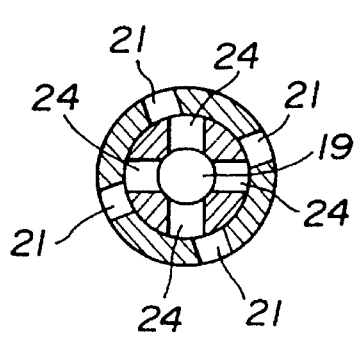
FIG. 8(a) is a cross-sectional view taken along the line K—K in FIG. 4 which shows an adjusting pin at a position ② in FIG. 6.
Figure 8B:
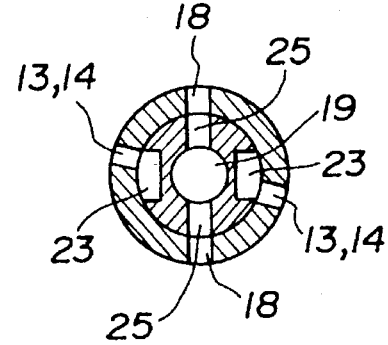
FIG. 8(b) is a cross-sectional view taken along the line M—M in FIG. 4 which shows an adjusting pin at a position ② in FIG. 6.
Figure 8C:
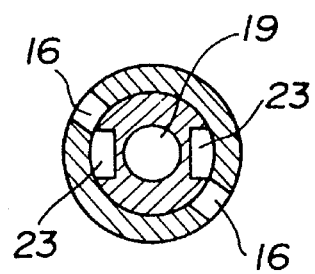
FIG. 8(c) is a cross-sectional view taken along the line N—N in FIG. 4 which shows an adjusting pin at a position ② in FIG. 6.
Figure 9A:
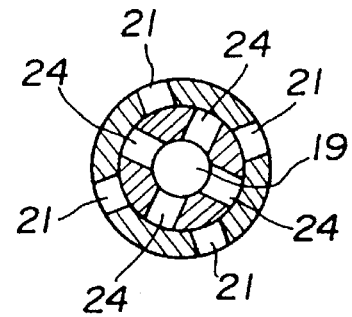
FIG. 9(a) is a cross-sectional view taken along the line K—K in FIG. 4 which shows an adjusting pin at a position ③ in FIG. 6.
Figure 9B:
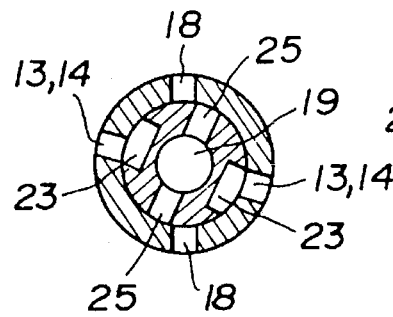
FIG. 9(b) is a cross-sectional view taken along the line M—M in FIG. 4 which shows an adjusting pin at a position ③ in FIG. 6.
Figure 9C:
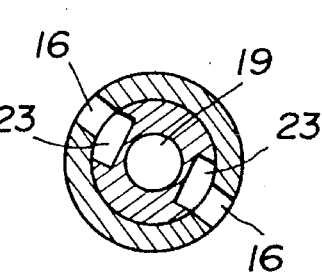
FIG. 9(c) is a cross-sectional view taken along the line N—N in FIG. 4 which shows an adjusting pin at a position ③ in FIG. 6.

Additionally, as shown in FIG. 6, rotating the adjusting pin 40 in a counterclockwise direction from the soft position causes the damping coefficient to be increased toward the hard position only in the rebounding stroke (i.e., during extension). Alternatively, rotating the adjusting pin 40 in a clockwise direction from the soft position causes the damping coefficient to change toward the hard position only in the bounding stroke (i.e., during compression) without any change in the rebounding stroke.

It will be noted that, in FIG. 6, when the adjusting pin 40 is rotated and halted at the three positions ①, ②, and ③, the cross-sectional situations of the adjusting pin taken along the line K—K, along the line M—M, and along the line N—N are shown in FIGS. 7(A), 8(A), and 9(A), FIGS. 7(B), 8(B), and 9(B), and FIGS. 7(C), 8(C), and 9(C) respectively.

Figure 10:
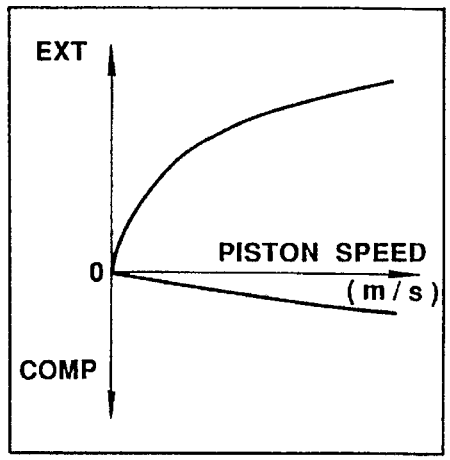
FIGS. 10, 11, and 12 are graphs which show relations between piston speed and damping force when an adjusting pin is arranged at positions ①, ②, and ③ in FIG. 6 respectively.
Figure 11:
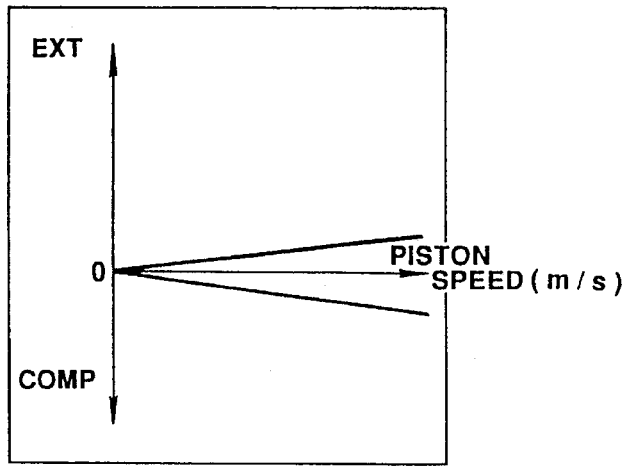
Figure 12:
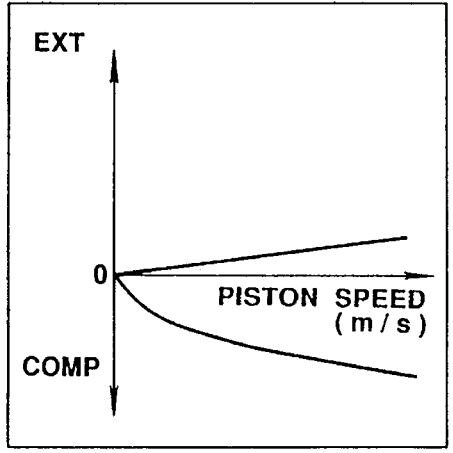

In addition, the damping force characteristics at the positions ①, ②, and ③ of the adjusting pin 40 are shown in FIGS. 10, 11, and 12.

Figure 13:
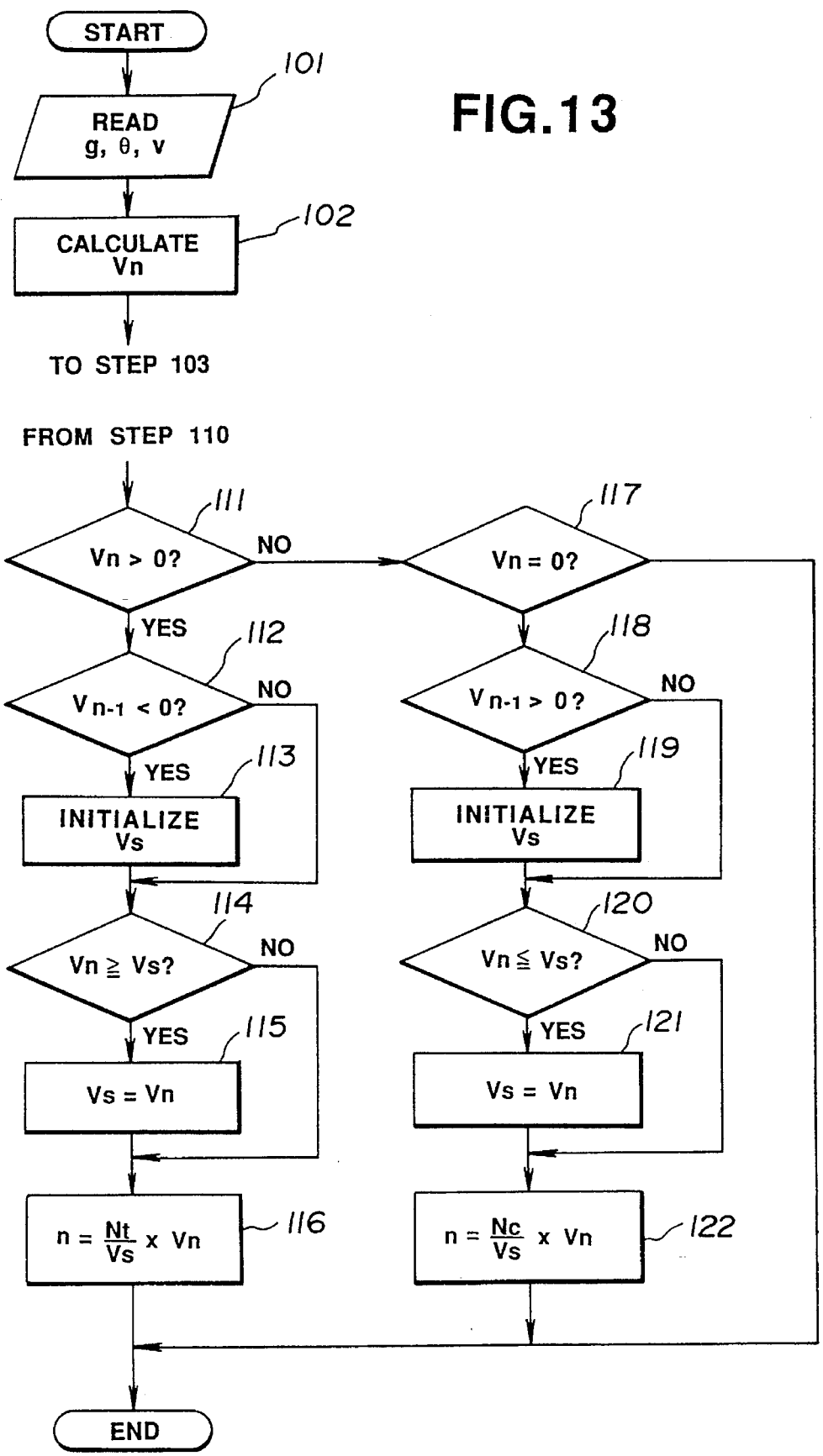
FIGS. 13 and 14 are flowcharts which show logical steps performed by a control unit of a suspension control system.
Figure 14:
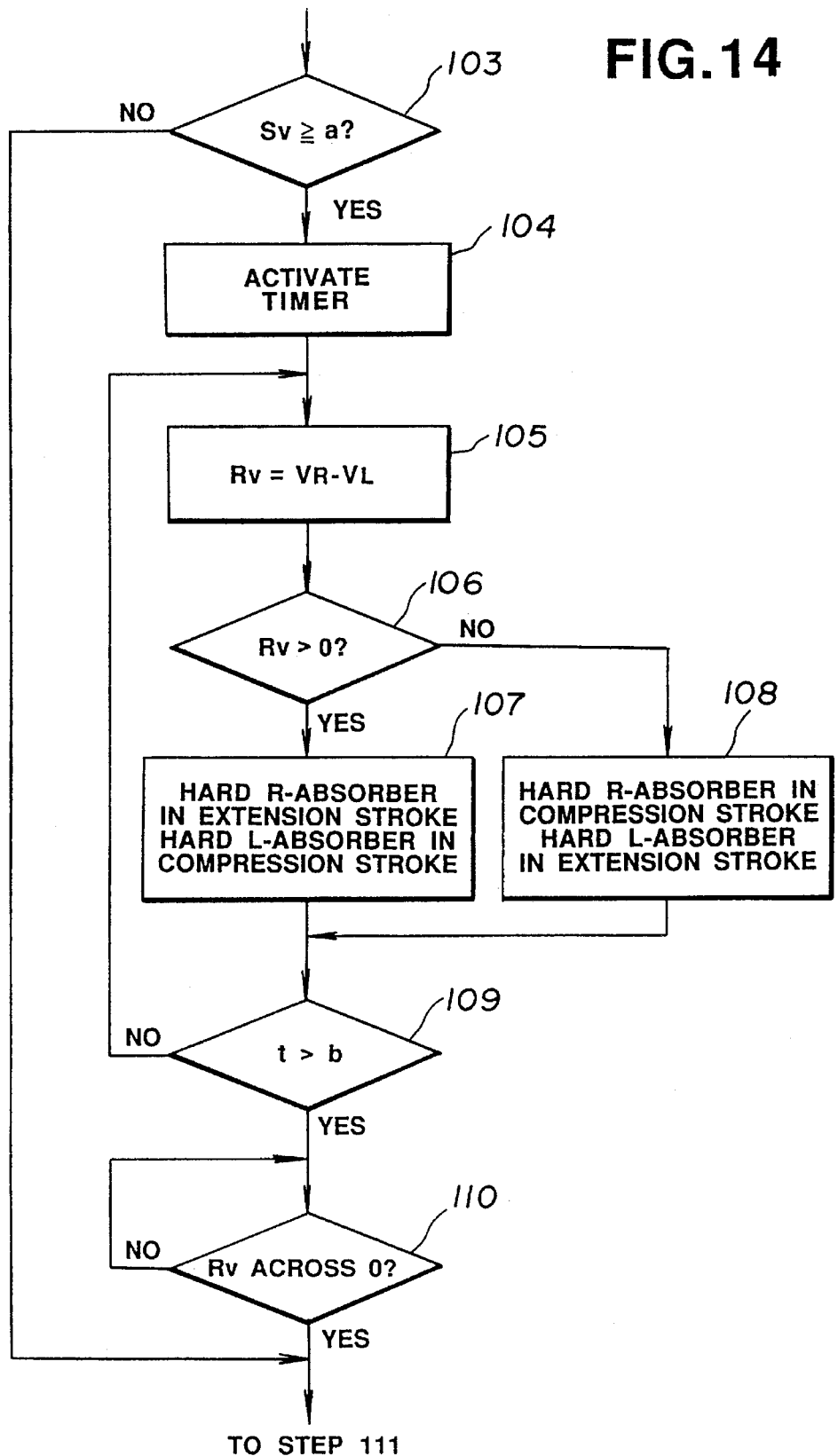

Referring to FIGS. 13 and 14, there is shown a flowchart of a program or sequence of the logical steps performed by the control unit 4 for controlling the operation of the pulse motor 3 for each shock absorber AS. This control is carried out for the shock absorbers SA independent of each other. However, the control may alternatively be carried out for the right and left shock absorbers separately from each other.

After entering the program, the routine proceeds to step 101 wherein the control unit 4 reads the vertical acceleration g detected by the vertical G sensor 1, the steered angle θ detected by the steering sensor 2, and the vehicle speed V detected by the vehicle speed sensor 5. The routine then proceeds to step 102 wherein a value of the detected vertical acceleration g is integrated to derive a vertical speed $V_n$ of the sprung mass.

The routine then proceeds to a sub-program as shown in FIG. 14. In step 103, a steering angular velocity $S_V$ is obtained based on a change rate of the steered angle θ and it is determined whether the steering angular velocity $S_V$ is greater than a preselected threshold value a or not for determining whether the vehicle body is rolled, or in transient turning or not. If a YES answer is obtained concluding that the vehicle is in the transient rolling motion, the routine then proceeds to step 104. Alternatively, if a NO answer is obtained in step 103, the routine proceeds to step 111 directly. The determination in step 103 may alternatively be made based on the relation between the steered angle θ and the vehicle speed V.

In step 104, a timer is activated for defining a minimum period of time required for controlling transient rolling motion of the vehicle body. The routine then proceeds to step 105 wherein a rolling motion velocity $R_V$ is calculated based on a vertical speed difference between the vertical speed $V_R$ at a right wheel and the vertical speed $V_L$ at a left wheel ($R_V=V_R-V_L$). The vertical speeds $V_R$ and $V_L$ may alternatively be provided with an average speed of front and rear wheels respectively.

Afterward, the routine proceeds to step 106 wherein it is determined whether the rolling motion velocity $R_V$ is greater than zero or not ($R_V>0$?). If a YES answer is obtained concluding that the rolling motion is directed to the left, lowering the left portion of the vehicle body, the routine then proceeds to step 107 wherein the damping coefficient of the right shock absorber SA during the rebounding stroke is set to the hard position and that during the bounding stroke is set to the soft position, while the damping coefficient of the left shock absorber SA during the bounding stroke is set to the hard position and that during the rebounding stroke is set to the soft position. Alternatively, if a NO answer is obtained in step 106 concluding that the rolling motion is directed to the right, lowering the right portion of the vehicle body, the routine then proceeds to step 108 wherein the damping coefficient of the right shock absorbers SA in the bounding stroke is set to the hard position and that in the rebounding stroke is set to the soft position, while the damping coefficient of the left shock absorber SA in the rebounding stroke is set to the hard position and that in the bounding stroke is set to the soft position.

With the above damping coefficient adjustment, when vibration in a direction opposite a shock absorber stroke due to road surface protrusions is transmitted to the wheels, it is absorbed effectively, ensuring driving comfort. However, the same damping coefficient may alternatively be provided in both bounding and rebounding strokes for controlling rolling motion only.

The routine then proceeds to step 109 wherein it is determined whether a preselected period of time b has passed after the activation of the timer in step 104 or not (t>b?). If a NO answer is obtained, the routine returns back to step 105. Alternatively, if a YES answer is obtained, the routine then proceeds to step 110 wherein it is determined whether a value of the rolling motion speed $R_V$ has passed across a preselected value, for example, zero or not. The preselected value may alternatively be set to a value adjacent zero. For example, the determination may be made whether a value of the rolling motion speed $R_V$ is decreased to within a range of 0±b. If a NO answer is obtained in step 110, the routine then repeats step 110. Alternatively, if a YES answer is obtained, the routine returns to the main program as shown in FIG. 13.

While step 109 is provided for defining a minimum control period of time for controlling vehicle attitude change in transient rolling motion, it may be omitted wherein the rolling control terminates when the rolling velocity becomes zero.

In step 111, it is determined whether the current vertical speed $V_n$ is positive or not ($V_n>0$?) for determining a stroke direction of the shock absorber SA. If a YES answer is obtained concluding that the shock absorber SA is in a rebounding stroke, the routine the proceeds to step 112. Alternatively, if a NO answer is obtained concluding that the shock absorber SA is in a bounding stroke (including a status where the shock absorber does not stroke in any direction), the routine proceeds to step 117.

In step 112, it is determined whether the vertical speed $V_{n-1}$ one program control cycle before is negative or not ($V_{n-1}<0$) for determining whether the stroke direction of the shock absorber is changed or not based on the results in step 111.

If a NO answer is obtained concluding that the stroke direction of the shock absorber is the same as that in the previous control cycle, the routine then proceeds to step 114 directly. Alternatively, if a YES answer is obtained concluding that the stroke direction of the shock absorber is changed, the routine then proceeds to step 113 wherein a threshold value $V_s$ for the vertical speed $V_n$ is initialized.

The routine then proceeds to step 114 wherein it is determined whether the vertical speed $V_n$ in the present program cycle is greater than the vertical speed threshold value $V_S$ or not ($V_n \geq V_S$?). If a NO answer is obtained, the routine then proceeds to step 116 directly. If a YES answer is obtained, the routine then proceeds to step 115 wherein the vertical speed threshold value $V_s$ is set to a value of the current vertical speed $V_n$.

The routine then proceeds to step 116 wherein a target damping control position n (corresponding to a damping coefficient of the shock absorber) in the rebounding stroke is mathematically calculated according to the following equation.

$$n = (N_t/V_s) \times V_n$$

where $N_t$ is a maximum damping control position during a rebounding stroke. It will be noted that the target damping control position n is an angular position of the adjusting pin 40 which corresponds to the number of drive pulses of the pulse motor 3 for determining a damping coefficient of the shock absorber SA.

In steps 114 to 116, when the vertical speed $V_n$ exceeds the vertical speed threshold value $V_s$, the maximum damping coefficient is provided. On the other hand, when the vertical speed $V_n$ is lower than the vertical speed threshold value $V_s$, the target damping control position n is determined based on a ratio of the vertical speed threshold value $V_s$ to the vertical speed $V_n$.

In step 111, if a NO answer is obtained, the routine then proceeds to step 117 wherein it is determined whether the vertical speed $V_n$ is zero or not ($V_n = 0$?). If a YES answer is obtained, the routine terminates. Alternatively, if a NO answer is obtained, the routine then proceeds to step 118 wherein the vertical speed $V_{n-1}$ one program cycle before is greater than zero or not ($V_{n-1} > 0$?). If a NO answer is obtained, the routine then proceeds to step 120 directly. Alternatively, if a YES answer is obtained, the routine then proceeds to step 119 wherein a threshold value $V_s$ for the vertical speed $V_n$ is initialized.

The routine then proceeds to step 120 wherein it is determined whether the vertical speed $V_n$ in the present program cycle is smaller than or equal to the vertical speed threshold value $V_s$ or not ($V_n \leq V_s$?). If a NO answer is obtained, the routine then proceeds to step 122 directly. If a YES answer is obtained, the routine then proceeds to step 121 wherein the vertical speed threshold value $V_s$ is set to a value of the current vertical speed $V_n$.

The routine then proceeds to step 122 wherein a target damping control position n (corresponding to a damping coefficient of the shock absorber) in the bounding stroke is mathematically calculated according to the following equation.

$$n = (N_c/V_s) \times V_n$$

where $N_c$ is a maximum damping position during a bounding stroke.

Figure 15:
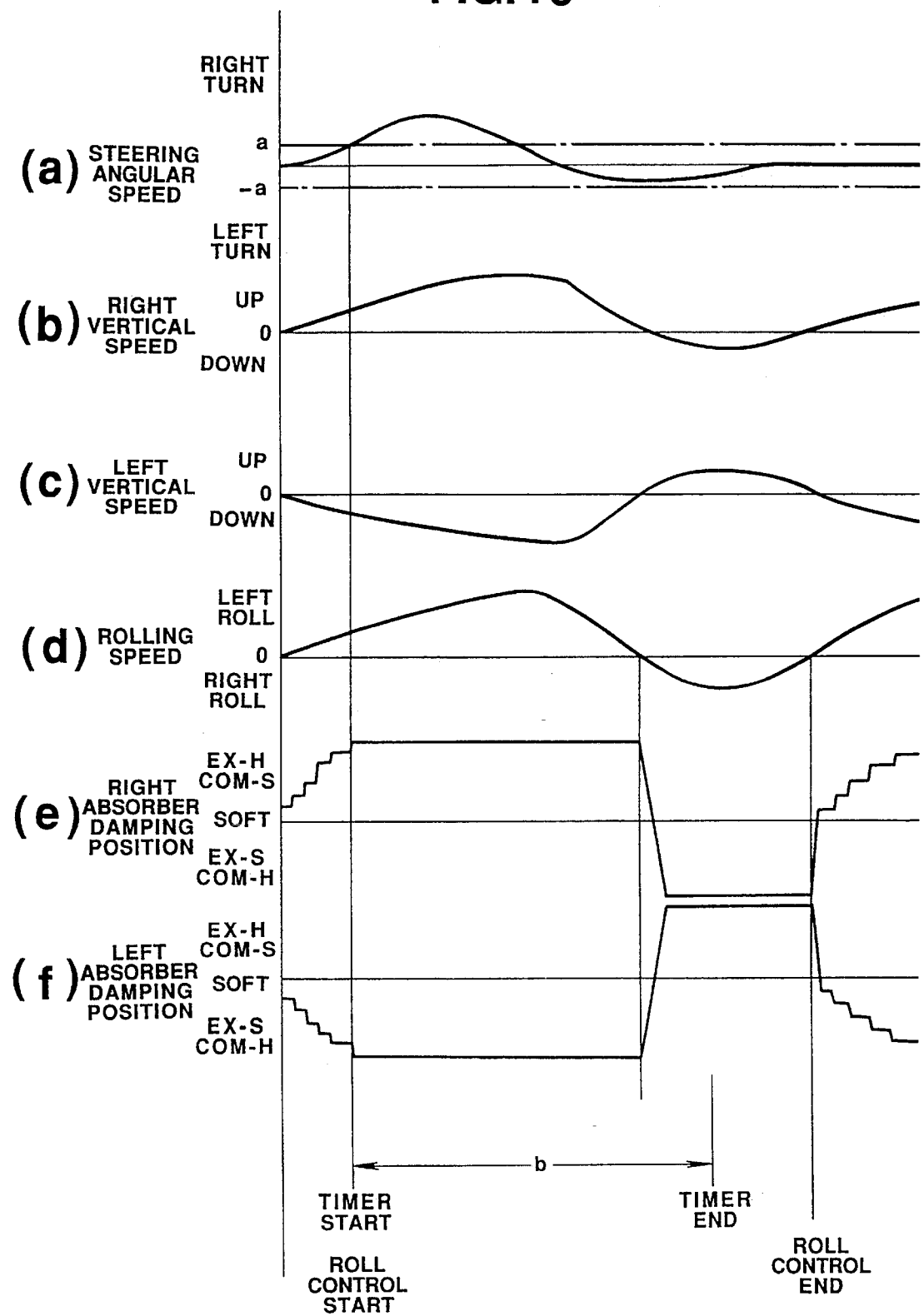
FIG. 15 is a time-chart which shows operation of a suspension control system of the invention.

Referring to FIG. 15, there is shown a time-chart which represents the operation of the system when the vehicle body is rolled at a rolling rate as shown in FIG. 15(d) caused by steering operation at angular velocity as shown in FIG. 15(a).

As shown in the time-chart, steering to the right causes the vehicle body to roll in the left direction, rising a right portion of the vehicle body with a left portion thereof being lowered. Thus, vertical speed at the right wheels is directed upward, while vertical speed at the left wheels is directed downward as shown in FIGS. 15(b) and (c).

Before the steering angular velocity $S_V$ exceeds the threshold value a, the rebounding motion damping coefficients of the right shock absorbers SA are, as shown in FIG. 13(e), increased in a stepwise fashion according to increase in the vertical speed $V_n$ (see steps 111 to 116). Likewise, the bounding motion damping coefficients of the left shock absorbers SA are, as shown in FIG. 13(f), increased in a stepwise fashion according to increase in the vertical speed $V_n$ (see steps 111, 117 to 122).

Afterward, when the steering angular velocity $S_V$ becomes greater than the threshold value a, the rolling control for suppressing transient rolling motion, as shown in FIG. 14, begins to start.

First, the timer is activated for counting a period of time t lapsed from the beginning of the rolling control. In the time-chart, b represents a period of time during which the timer is activated.

When the vehicle body is, as shown in the drawing, rolled to the left, the rolling velocity $R_V$ becomes positive. The control unit 4 thus modifies the damping coefficients during the rebounding stroke of the shock absorbers SA at the right wheels to the hard characteristics, while the damping coefficients during the bounding stroke of the shock absorbers SA at the left wheels are modified to the hard characteristics for suppressing transient rolling motion to the left caused by the steering operation to the right.

The above rolling control continues as long as the timer is activated. Accordingly, when the rolling direction is changed to the right, the logical steps 106 and 108 are carried out wherein the damping coefficients of the right shock absorbers SA during the bounding stroke are placed at the hard position and those during the rebounding stroke are placed at the soft position, while the damping coefficients of the left shock absorbers SA during the rebounding stroke are placed at the hard position and those during the bounding stroke are placed at the soft position, thereby suppressing transient rolling motion to the right caused by steering operation to the left.

When the period of time b has passed and the rolling velocity $R_V$ becomes zero, the rolling control as shown in FIG. 14, terminates. At this time, when the steering angular velocity $S_V$ is less than the threshold value a, the suspension control, as shown in FIG. 13, begins to start wherein the damping coefficients of the shock absorbers SA are adjusted in a stepwise fashion respectively according to the vertical speeds $V_n$ at each wheel.

With the above mentioned suspension control, when the vehicle travels straight on an inclined road surface, the steering angular velocity $S_V$ does not exceed the threshold value a and thus the rolling control, as shown in FIG. 14, is not carried out for securing good riding comfort without undesirably regulating the damping coefficients of the shock absorbers to the hard characteristics.

As mentioned previously, the suspension control system of the invention serves to modify damping forces of the shock absorbers for suppressing transient rolling motion created, for example, when the vehicle enters a corner or approaches an end of the corner, allowing the vehicle body to roll slightly. Therefore, improved anti-rolling control is provided without giving passengers an unpleasant ride as compared with a prior art anti-rolling suspension control system which is operable to level a vehicle body at a preselected height during turning.

While the present invention has been disclosed in terms of the preferred embodiment in order to facilitate better understanding thereof, it should be appreciated that the invention can be embodied in various ways without departing from the principle of the invention. Therefore, the invention should be understood to include all possible embodiments and modification to the shown embodiments which can be embodied without departing from the principle of the invention as set forth in the appended claims.

What is claimed is:

1. A suspension control system for a vehicle comprising:

shock absorbers disposed between a vehicle body and vehicle wheels, respectively, each shock absorber being variable of damping characteristic from soft to hard;

damping characteristic modifying means for modifying the damping characteristics of said shock absorbers;

sensor means, including a steering angle sensor which detects a steered angle of the steering wheel, for monitoring a preselected vehicle driving parameter representing rolling motion of the vehicle body and for providing a signal indicative thereof;

a first vertical acceleration sensor mounted on a first lateral portion of the vehicle body to detect vertical acceleration of the first lateral portion and produce a first signal indicative thereof;

a second vertical acceleration sensor mounted on a second lateral portion of the vehicle body opposite to the first lateral portion to detect vertical acceleration of the second lateral portion and produce a second signal indicative thereof; and control means, responsive to said sensor means and said first and second vertical acceleration sensors, for determining a steering angular velocity based on the steered angle detected by the steering angle sensor and for determining that the vehicle is in a transient status of rolling motion when the steering angular velocity is greater than a preselected threshold value, and for computing a vertical speed difference between the first and second lateral portions of the vehicle body based on said signals from said first and second vertical acceleration sensors, said control means controlling said damping characteristic modifying means based on said vertical speed difference when the vehicle is in the transient status of rolling motion, said control means terminating rolling motion control when the vertical speed difference becomes a preselected value.

2. A system as set forth in claim 1, wherein said control means modifies the damping force during a compression stroke of said shock absorber arranged at a portion of the vehicle body lowered caused by the rolling motion to the hard characteristics and the damping force during an extension stroke of said shock absorber arranged at a portion of the vehicle body lifted up caused by the rolling motion to the hard characteristic.

3. A system as set forth in claim 2, wherein said control means modifies the damping force during the extension stroke of said shock absorber arranged at the portion of the vehicle body lowered caused by the rolling motion top the soft characteristics and the damping force during the compression stroke of said shock absorber arranged at the portion of the vehicle body lifted up caused by the rolling motion to the soft characteristic.

4. A system as set forth in claims 1, wherein said control means includes a timer which is activated when the steering angular velocity becomes greater than the preselected threshold value, said control means terminating said rolling motion control after a preselected period of time has passed after activation of said timer.

5. A system as set forth in claim 1, wherein said damping force adjusting means includes adjusting pins each serving to modify a flow passage cross sectional area of said shock absorber for adjusting a damping coefficient of the shock absorber.

* * * * *